(12) United States Patent
Atohira et al.

(10) Patent No.: US 9,718,189 B2
(45) Date of Patent: Aug. 1, 2017

(54) ROBOT TEACHING DEVICE FOR TEACHING ROBOT OFFLINE

(71) Applicant: FANUC Corporation, Yamanashi (JP)

(72) Inventors: Hiroyuki Atohira, Yamanashi (JP); Yoshiharu Nagatsuka, Yamanashi (JP); Kozo Inoue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 7 days.

(21) Appl. No.: 14/874,575

(22) Filed: Oct. 5, 2015

(65) Prior Publication Data

US 2016/0096269 A1  Apr. 7, 2016

(30) Foreign Application Priority Data

Oct. 7, 2014  (JP) ................................. 2014-206563

(51) Int. Cl.
  *B25J 9/16*  (2006.01)
  *G05B 19/423*  (2006.01)

(52) U.S. Cl.
  CPC ............ *B25J 9/1687* (2013.01); *Y10S 901/05* (2013.01)

(58) Field of Classification Search
  CPC ...... B25J 9/1687; B25J 9/1666; B25J 9/1656; B25J 9/1664; B25J 9/1671; B25J 9/0081; Y10S 901/05; B23K 11/11; G05B 2219/45104; G05B 2219/39094; G05B 19/42; G05B 19/4202; G05B 19/4205; G05B 19/4207; G05B 19/421; G05B 19/423; G05B 19/425; G05B 19/427
  See application file for complete search history.

(56) References Cited

U.S. PATENT DOCUMENTS

| 4,568,816 A | * | 2/1986 | Casler, Jr. ......... | G05B 19/4083 |
|---|---|---|---|---|
| | | | | 219/124.34 |
| 4,812,614 A | * | 3/1989 | Wang .................. | B23K 9/1274 |
| | | | | 219/124.34 |
| 5,845,053 A | * | 12/1998 | Watanabe ............... | B23K 9/12 |
| | | | | 219/124.33 |

(Continued)

FOREIGN PATENT DOCUMENTS

| CN | 101653939 A | 2/2010 |
|---|---|---|
| CN | 103085072 A | 5/2013 |

(Continued)

*Primary Examiner* — Stephen Holwerda
(74) *Attorney, Agent, or Firm* — Hauptman Ham, LLP (57) ABSTRACT

A robot teaching device for teaching a robot offline, capable of setting target, advance and rotation angles of a tool, so that a flat and stable posture of the tool can be obtained. The teaching device has: a storing part which stores a combination of a plurality of processing portion shapes and the target and advance angles associated with each processing portion; a first setting part which sets the target and advance angles associated with the selected processing portion shape, as target and advance angles with respect to the designated processing portion shape; and a second setting part which rotates the tool about a longitudinal axis thereof while maintaining the target and advance angles, so as to calculate the rotation angle of the tool, wherein a height of a face plate of the robot from a horizon plane in the virtual space is maximum at the rotation angle.

4 Claims, 6 Drawing Sheets

(56) References Cited

U.S. PATENT DOCUMENTS

| | | | |
|---|---|---|---|
| 6,522,949 B1* | 2/2003 | Ikeda | G05B 19/425 |
| | | | 219/121.63 |
| 2004/0138779 A1* | 7/2004 | Shibata | B23K 11/11 |
| | | | 700/245 |
| 2005/0224479 A1* | 10/2005 | Watanabe | B25J 9/1666 |
| | | | 219/125.1 |
| 2006/0212170 A1 | 9/2006 | Nagatsuka et al. | |
| 2007/0083291 A1* | 4/2007 | Nagatsuka | B23K 26/04 |
| | | | 700/252 |
| 2011/0238215 A1* | 9/2011 | Yanagawa | G05B 19/42 |
| | | | 700/258 |
| 2012/0031886 A1* | 2/2012 | Hara | B23K 9/095 |
| | | | 219/137 R |
| 2013/0026148 A1* | 1/2013 | Aoyama | B23K 9/235 |
| | | | 219/124.33 |
| 2013/0116822 A1* | 5/2013 | Atohira | G05B 19/4097 |
| | | | 700/255 |

FOREIGN PATENT DOCUMENTS

| | | |
|---|---|---|
| CN | 104070265 A | 10/2014 |
| CN | 104070266 A | 10/2014 |
| JP | S63256281 A | 10/1988 |
| JP | H10-011127 A | 1/1998 |
| JP | 2000094131 A | 4/2000 |
| JP | 2005021971 A | 1/2005 |
| JP | 2007-90479 A | 4/2007 |
| JP | 2011002888 A | 1/2011 |
| JP | 2011045934 A | 3/2011 |

* cited by examiner

ROBOT TEACHING DEVICE FOR TEACHING ROBOT OFFLINE

RELATED APPLICATIONS

The present application claims priority to Japanese Application Number 2014-206563, Oct. 7, 2014, the disclosure of which is hereby incorporated by reference herein in its entirety.

BACKGROUND OF THE INVENTION

1. Field of the Invention

The preset invention relates to a robot teaching device for teaching a robot which carries out processing within a virtual space.

2. Description of the Related Art

In the prior art, in a device which teaches a robot program offline for operating a robot configured to carry out processing such as welding, a welding point is designated on a three-dimensional model of a workpiece positioned in a virtual space, and a condition such as a posture of a welding torch arranged on a hand of the robot is designated in order to generate a teaching point.

As a related art document, JP H10-011127 A discloses an offline teaching method for an arc welding robot. Concretely, it describes that "i(I)n a torch teaching data operation part, while an operator looks at a workpiece and a torch on a CAD, the torch angle in a plurality of teaching points and the position of the torch side mounting points are input by the operator, and a computer stores these statuses as torch teaching data. That is, since only the torch is moved relative to the workpiece for teaching, the teaching operation of the torch is very easy. In particular, since it is necessary to perform teaching at the plurality of points during the arc welding operation, the teaching operation can be performed more easily."

In the prior art, the condition including the posture of the welding torch is designated in order to generate the teaching point. However, an appropriate target angle or advance angle is different depending on the shape of the workpiece. Further, in the prior art, the rotation angle of the tool (or the torch) is indefinite, and thus the appropriate rotation angle must be found by trial and error, in order to determine the flat and stable posture of the welding torch. Therefore, in the prior art, it takes time to carry out setting of the posture of the welding torch.

SUMMARY OF THE INVENTION

Therefore, an object of the present invention is to provide a robot teaching device for teaching a robot offline, capable of appropriately setting a target angle, an advance angle and a rotation angle of a tool of the robot, so that a flat and stable posture of the tool can be obtained.

According to the present invention, there is provided a robot teaching device for locating a workpiece and a robot having a tool in a virtual space, and for setting a target angle, an advance angle and a rotation angle about a longitudinal axis of the tool, the angles being used to determine a posture of the tool when the robot processes the workpiece, the robot teaching device comprising: a locating part which locates three-dimensional models of the robot and the workpiece in a virtual space; a designating part which designates a processing portion of the three-dimensional model of the workpiece; a storing part which stores a combination of shapes of a plurality of predetermined processing portions and the target angle and the advance angle of the tool associated with each of the processing portions; a selecting part which selects the shape of the processing portion corresponding to the designated processing portion, among the plurality of shapes of the processing portions stored in the storing part; a first setting part which sets the target angle and the advance angle of the tool associated with the selected shape of the processing portion, as a target angle and an advance angle of the tool with respect to the designated processing portion; and a second setting part which rotates the tool about the longitudinal axis of the tool while the target angle and the advance angle of the tool relative to the processing portion are maintained, so as to calculate and set the rotation angle of the tool about the longitudinal axis of the tool, wherein a height of a face plate of the robot from a horizon plane of the virtual space is maximum at the rotation angle.

In a preferred embodiment, the robot teaching device further comprises: a detecting part which detects an inaccessible point where the robot cannot reach when the robot is moved while maintaining the target angle, the advance angle and the rotation angle of the tool which are set relative to the processing portion; and a third setting part which rotates the tool about the longitudinal axis of the tool at the inaccessible point, while the target angle and the advance angle of the tool relative to the processing portion are maintained, so as to calculate and set an accessible point where the robot can reach, wherein a distance between an origin of the robot and the face plate of the robot is minimum.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
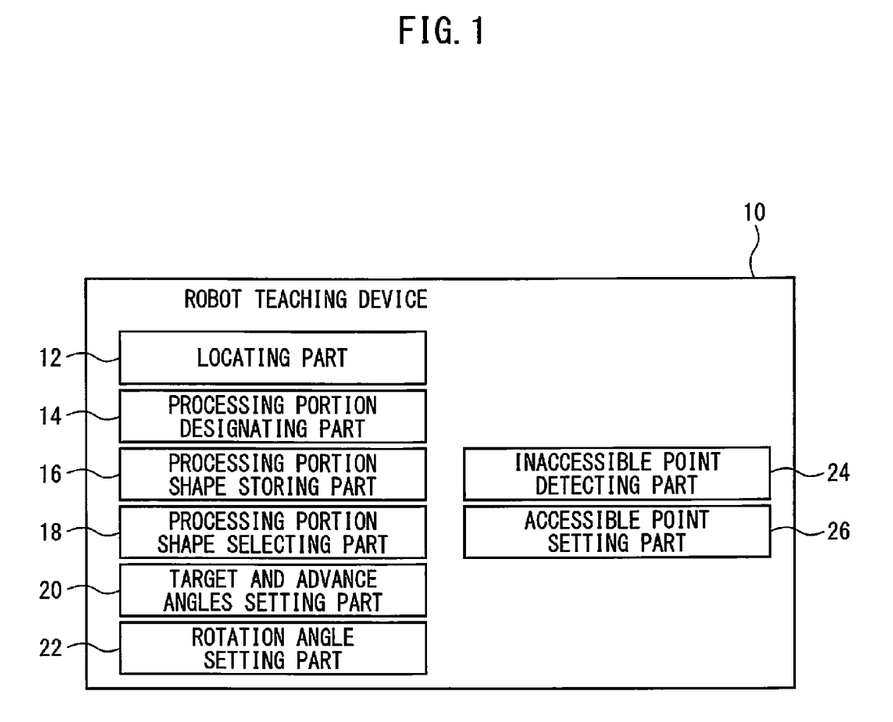
FIG. 1 is a functional block diagram of a robot teaching device according to an embodiment of the present invention.

FIG. 1 is a functional block diagram of a robot teaching device according to an embodiment of the present invention.

Robot teaching device 10 is configured to locate a workpiece and a robot having a tool in a virtual space, and set or determine a target angle, an advance angle and a rotation angle about a longitudinal axis of the tool, the angles being used to determine a posture of the tool when the robot processes the workpiece. Robot teaching device 10 includes: a locating part 12 which locates three-dimensional models of the robot and the workpiece in a virtual space; a designating part (or a processing portion designating part) 14 which designates a processing portion of the three-dimensional model of the workpiece; a storing part (or a processing portion shape storing part) 16 which stores a combination of shapes of a plurality of predetermined processing portions and the target angle and the advance angle of the tool associated with each of the processing portions; a selecting part (or a processing portion shape selecting part) 18 which selects the shape of the processing portion corresponding to the designated processing portion, among the plurality of shapes of the processing portions stored in storing part 16; a first setting part (or a target and advance angles setting part) 20 which sets the target angle and the advance angle of the tool associated with the selected shape of the processing portion, as a target angle and an advance angle of the tool with respect to the designated processing portion; and a second setting part (or a rotation angle setting part) 22 which rotates the tool about the longitudinal axis of the tool while the target angle and the advance angle of the tool relative to the processing portion are maintained, so as to calculate and set the rotation angle of the tool about the longitudinal axis of the tool, wherein a height of a face plate of the robot from a horizon plane of the virtual space is maximum at the rotation angle.

Further, robot teaching device 10 may include: a detecting part (or an inaccessible point detecting part) 24 which moves the robot so as to represent the posture in which the robot can process the processing portion, and detects an inaccessible point where the robot cannot reach, if any; and a third setting part (or an accessible point detecting part) 26 which rotates the tool about the longitudinal axis of the tool at the inaccessible point, while the target angle and the advance angle of the tool relative to the processing portion are maintained, so as to calculate and set an accessible point where the robot can reach, wherein a distance between an origin of the robot and the face plate of the robot is minimum.

For example, robot teaching device 10 of the present invention may be a personal computer, each component of the device as described above may carry out a given process by an operation of an operator via a suitable input means. Otherwise, the functions of robot teaching device 10 may be incorporated in a robot controller, and the scope of the invention includes such a configuration.

Figure 2:
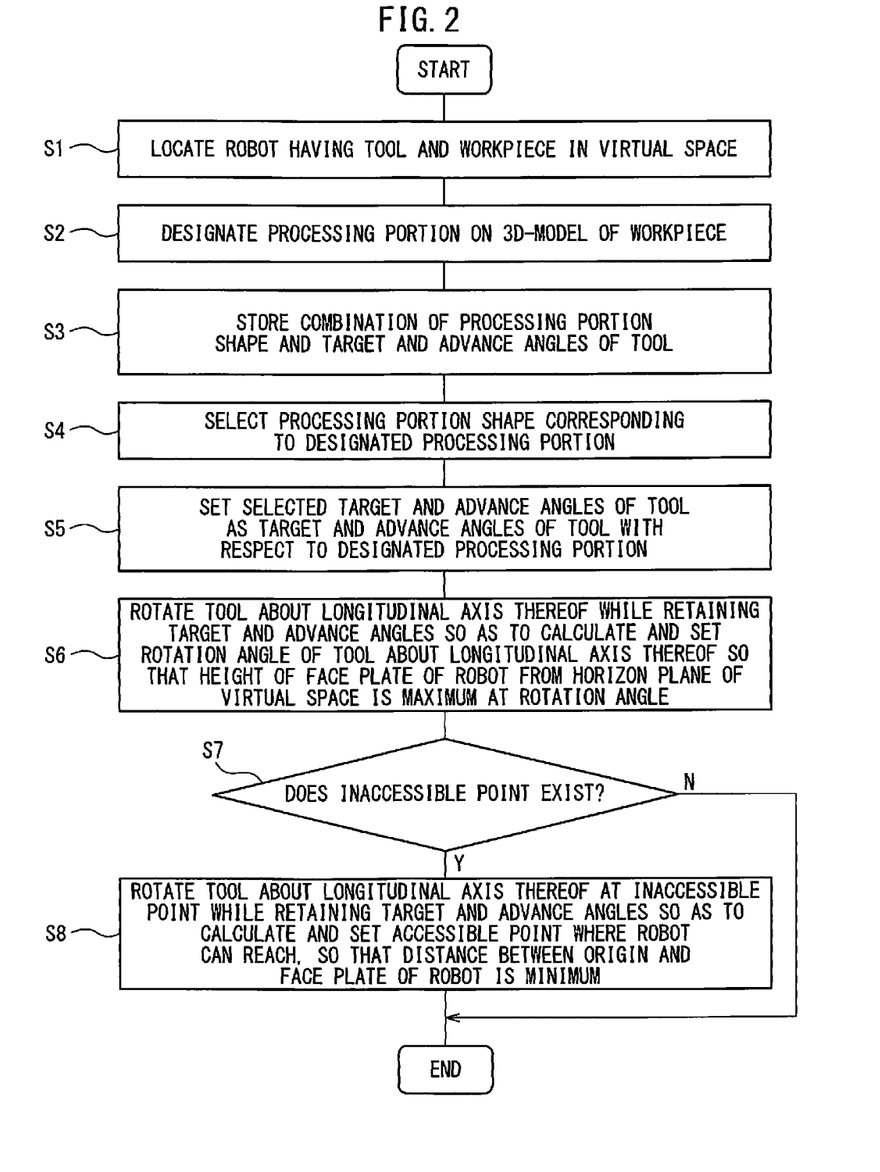
FIG. 2 is a flowchart showing an example of a procedure in the robot teaching device of the invention.
Figure 3:
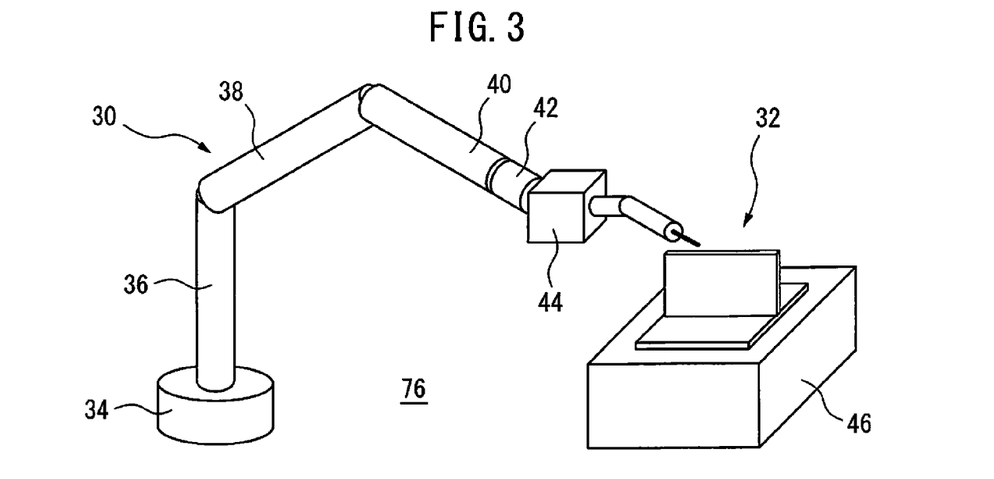
FIG. 3 shows an example in which a robot and a workpiece are located in a virtual space.

Hereinafter, with reference to a flowchart of FIG. 2, the procedure in robot teaching device 10 will be explained. First, as shown in FIG. 3, the operator uses the suitable input means so that a three-dimensional model of robot 30 to which a tool is mounted, and a three-dimensional model of an object to be processed (or a workpiece) 32 are located in a virtual space (step S1). In the illustrated embodiment, robot 30 is a multi-joint robot having six axes, having a base 34; a rotating body 36 rotatably attached to base 34; an upper arm 38 rotatably attached to rotating body 36; a forearm 40 rotatably attached to upper arm 38; a wrist element 42 rotatably attached to forearm 40; and a work tool 44 such as a welding torch attached to wrist element 42. In robot teaching device 10, processing (such as machining or welding) of workpiece 32 positioned on a jig 46 by robot 30 can be simulated, and a robot program for carrying out the processing can be taught.

In the next step S2, the operator uses the suitable input means so that a processing portion is designated on the three-dimensional model of workpiece 32 located in the virtual space. As exemplified in FIG. 4, generally rectangular two plate members 48 and 50 are joined by fillet welding, so as to form a T-joint. Therefore, in this example, the processing portion is a straight processing line (or a welding line) 52, and a front end of tool (or welding torch) 44 moves along processing line 52.

Figure 5:
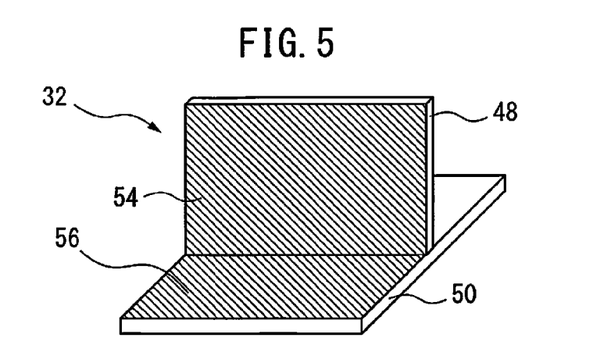
FIG. 5 shows another example in which a processing portion is designated on the workpiece having the T-joint shape.

Instead of processing line 52, a surface can be designated as the processing portion. For example, as shown in FIG. 5, one surface 54 of first plate member 48, and one region 56 formed by dividing one surface of second plate member 50 by welding line 52, may be designated as the processing portion. In this case, a boundary between surfaces 54 and 56 is designated as the processing portion.

Figure 6:
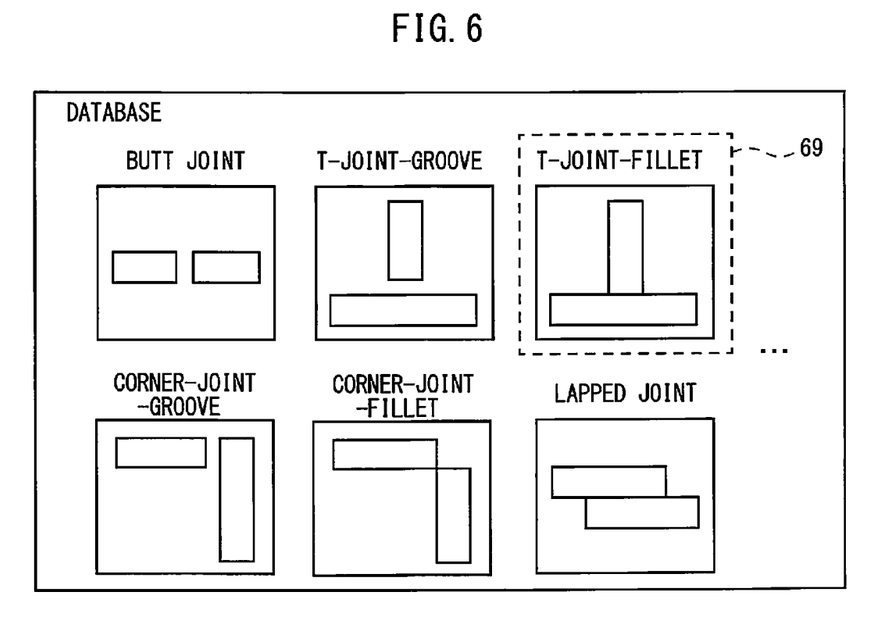
FIG. 6 shows an example in which the shapes of the processing portions are classified into a plurality of patterns based on the type or processing manner of the workpiece.

In the next step S3, combinations of a plurality of predetermined typical shapes of processing portions (processing portion shapes) and a target angle and an advance angle of tool 44 relative to each shape of processing portion, is stored in storing part 16. For example, as shown in FIG. 6, when the processing is welding, the shapes of the processing portions are classified into a plurality of patterns based on the type of joint (such as a butt joint, a T-joint, a corner joint, or a lapped joint, etc.) and a welding technique (such as groove welding or fillet welding, etc.). Then, predetermined target and advance angles of tool (welding torch) 44 are combined with each pattern corresponding thereto, and the obtained combinations are stored in storing part 16 such as a database, etc.

Figure 4:
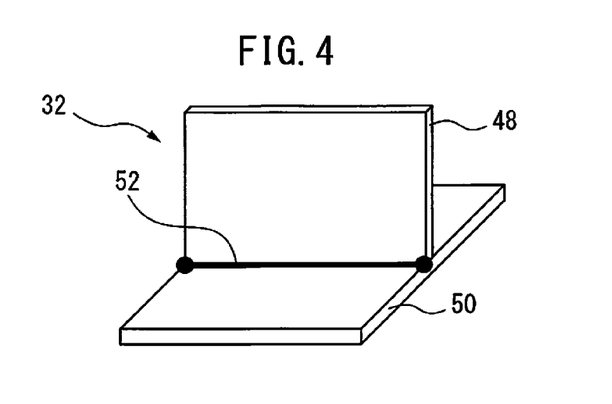
FIG. 4 shows an example in which a processing line is designated on a workpiece having a T-joint shape.
Figure 7:
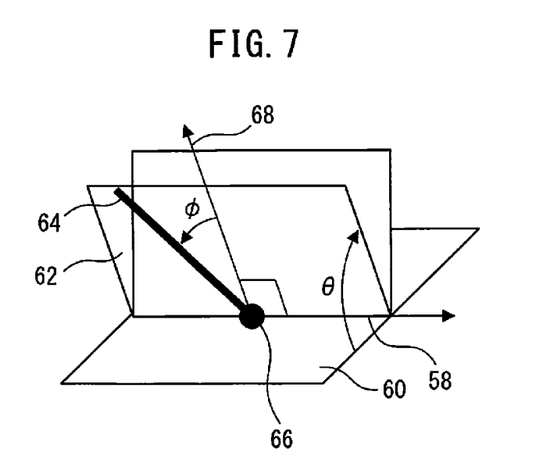
FIG. 7 shows an example of a combination of the shape of the processing portion and a target angle and an advance angle associated with the shape of the processing portion.

FIG. 7 shows an example of the combinations of the processing portions and target angle θ and advance angle φ associated with respective processing portions, which are stored in the database (or storing part 16). Target angle θ and advance angle φ are values representing the posture of the tool such as the welding torch. For example, when the processing portion shape is a T-joint as shown in FIG. 4, target angle θ is formed by a reference plain surface 60 representing a portion where a processing line 58 exist, and a plain surface 62 where a longitudinal line 64 of the tool and processing line 58 (or a tangential line of processing line 58 when the processing line is not straight) lie. On the other hand, advance angle φ is formed by longitudinal line 64 and a normal line 68 which lies on plain surface 62 and extends from a tool center point 66 perpendicular to processing line 58 (or the tangential line of processing line 58 when the processing line is not straight).

As described above, in step S3, the target and advance angles of the tool suitable for processing each processing portion are associated with the corresponding processing portion, and are stored in the database (or storing part) 16. In this regard, the procedure of step S3 may be performed before the next step S4. Therefore, step S3 may be performed before step S1 or S2.

In the next step S4, the operator uses the suitable input means so as to select the shape of the processing portion corresponding to the designated processing portion among the processing portions stored in storing part 16. For example, as shown by a dashed line 69 in FIG. 6, the operator can select one of the displayed processing portions, by clicking the mouse, etc.

Figure 8:
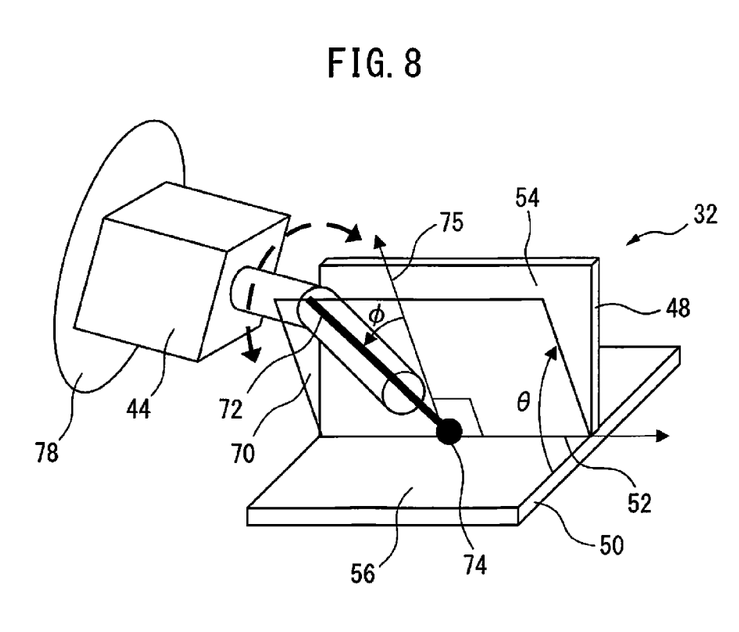
FIG. 8 shows a teaching example in which fillet welding is carried out on the T-joint.

In the next step S5, as exemplified in FIG. 7, stored target angle θ and advance angle φ of the tool combined with the selected processing portion shape are set or determined as target angle θ and advance angle φ of the tool with respect to processing line 52. FIG. 8 shows a teaching example in which fillet welding is carried out by tool 44 along processing line 52, when the processing portion shape is the T-joint as shown in FIG. 4. In this example, target angle θ is formed by one surface of workpiece 32 including processing line 52 (in this example, surface 56 of second plate member 50 (see FIG. 5)), and a plain surface 70 where a longitudinal line 72 of tool 44 and processing line 52 (or a tangential line of processing line 52 when the processing line is not straight) lie. On the other hand, advance angle φ is formed by longitudinal line 72 and a normal line 75 which lies on plain surface 70 and extends from a tool center point 74 (or an intersection point between longitudinal line 72 and processing line 52) perpendicular to processing line 52 (or the tangential line of processing line 52 when the processing line is not straight).

The setting in step S5 may be automatically carried out by first setting part 20 based on the procedures in step S1 to S4, or may be carried out by numerical input by the operator. At this point, among the target angle, the advance angle and the rotation angle which determine the posture of tool 44, the target and advance angles are determined, while the rotation angle of tool 44 about longitudinal axis 72 is not determined.

Figure 9:
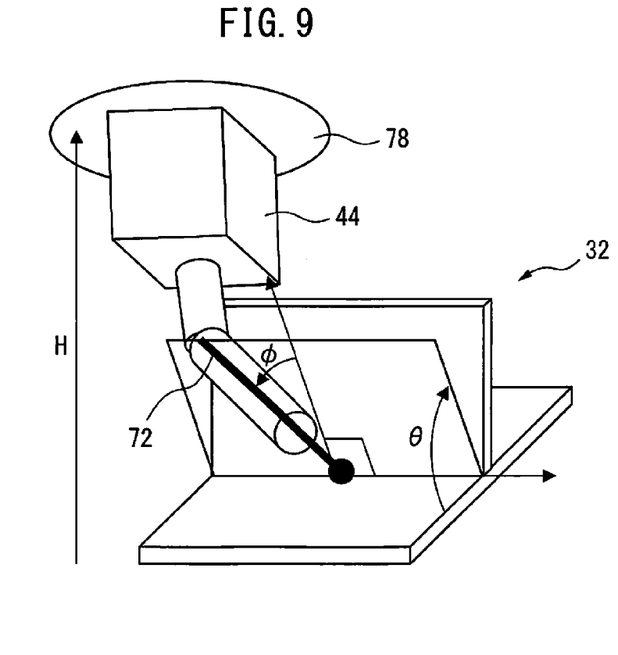
FIG. 9 shows a state in which a tool is rotated about a longitudinal axis thereof from the state of FIG. 8.

In the next step S6, as shown in FIG. 9, tool 44 is rotated about longitudinal axis 72 of the tool while target angle θ and advance angle φ relative to the processing portion are maintained so as not to be changed from the set values, so as to calculate and set the rotation angle of tool 44 about longitudinal axis 72 of the tool relative to processing line 52, wherein a face plate 78 of the robot downwardly faces a horizon plane 76 in the vertical space (see FIG. 3) and a height H of (a center of) face plate 78 from horizon plane 76 is maximum at the rotation angle. In this regard, face plate 78 means a generally flat portion of robot 30 to which tool 44 is attached, for example, a front end surface of wrist element 42, to which tool 44 is attached, may correspond to face plate 78. On the other hand, horizon plane 76 means a reference horizontal surface in the virtual space, for example, an installation surface, on which robot 30 or jig 44 is located, may correspond to horizon plane 76 (see FIG. 3). However, the other horizon surface may be used as long as the horizon surface is positioned below tool 44 in the vertical direction and the height of the horizon surface is not changed even when robot 30 is operated.

By the procedures of steps S1 to S6, the posture of tool 44 (the target, advance and rotation angles) relative to processing line 52 is determined, and then robot 30 (or the robot program for operating robot 30) for carrying out processing along processing line 52 can be taught. In other words, in the present invention, the determined target and advance angles are basically not changed from the respective angles associated with the predetermined processing portion shape. By calculating and setting the rotation angle of tool 44 about longitudinal axis 72 of the tool, so that face plate 78 of robot 30 downwardly faces horizon plane 76 and height H of face plate 78 from horizon plane 76 is maximum at the rotation angle, the flat and stable posture of tool 44 can be obtained, and processing accuracy of the actual robot will be able to be significantly improved.

On the other hand, when robot 30 is moved while maintaining the posture (or the target, advance and rotation angles) of the tool determined relative to the processing portion, an inaccessible point where the robot cannot reach (for example, an operating range of at least one axis of robot 30 exceeds a movable range thereof at the inaccessible point) may be generated.

Therefore, in step S7, inaccessible point detecting part 24 as described above can detect as to whether the inaccessible point exists or not, and information (for example, a coordinate of the tool center point of the robot) of the inaccessible point, if any. When the inaccessible point is detected, third setting part (or accessible point setting part) 26 as described above rotates tool 44 about longitudinal axis 72 of the tool while the target and advance angles relative to processing line 52 are maintained, so as to calculate and set an accessible point where robot 30 can reach and where a distance between the origin of robot 30 and face plate 78 of robot 30 is minimum (step S8).

Figure 10:
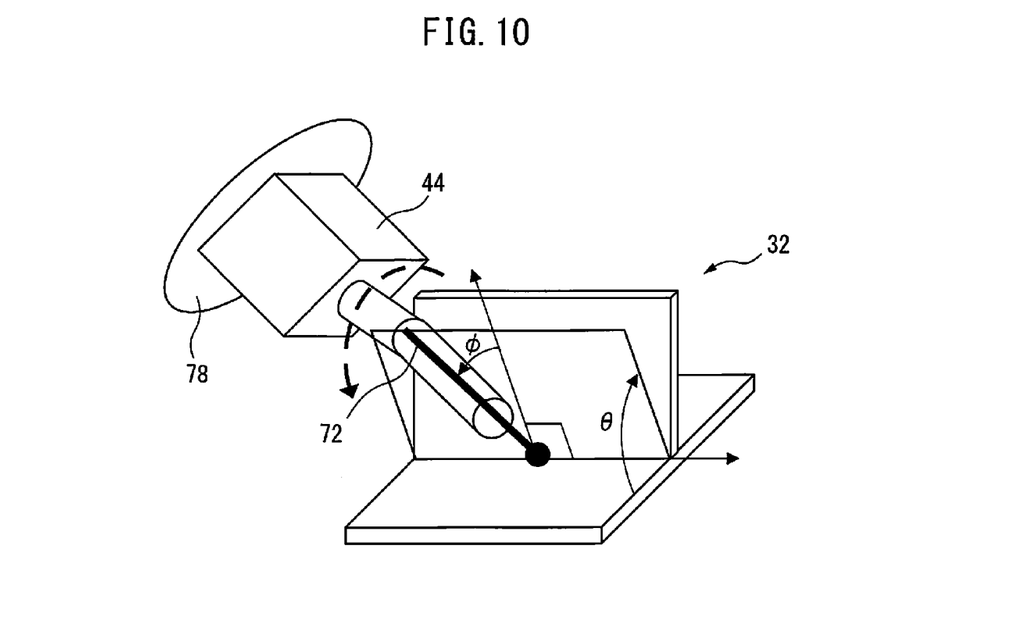
FIG. 10 shows a state in which the tool is rotated about a longitudinal axis thereof from the state of FIG. 9, in order to avoid an inaccessible point and determine an accessible point.
Figure 11:
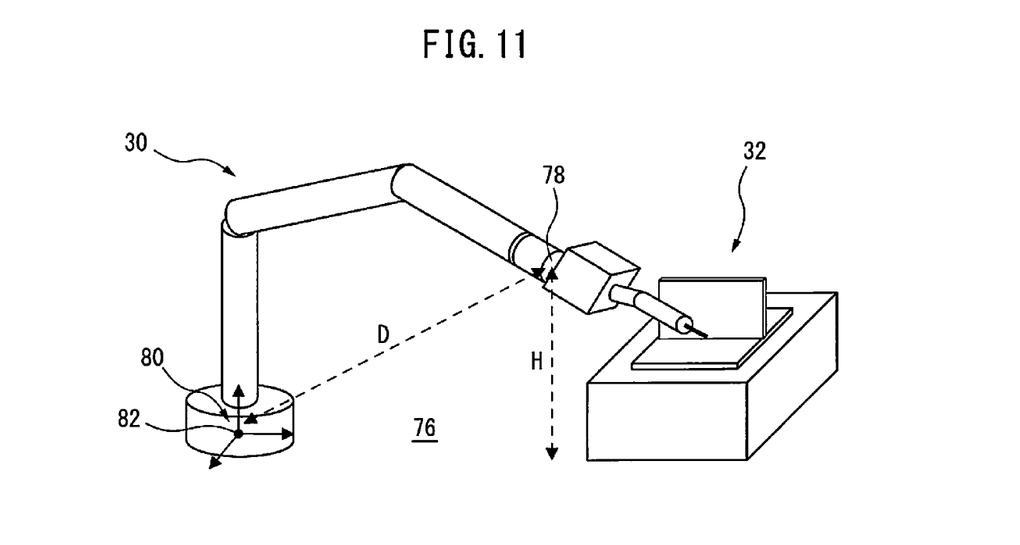
FIG. 11 shows an example in which the robot and the workpiece are located in the virtual space, corresponding to the state of FIG. 10.

FIGS. 10 and 11 show a concrete example of the procedure in step S8. When the inaccessible point will occur if robot 30 is moved while maintaining the posture of tool 44 as shown in FIG. 9, tool 44 is rotated about longitudinal axis 72 thereof (FIG. 10), so that distance D between the origin of robot 30 (for example, an origin 82 of a reference coordinate system 80 of robot 30) and face plate 78 of robot 30 is minimum (FIG. 11). When the robot position (or the position and posture of each axis) in which distance D is minimum is accessible for the robot, the robot position is set or determined as the accessible point. Otherwise, an appropriate accessible point can be calculated, by repeating a procedure for judging as to whether the robot can reach a robot position where distance D between the origin of robot 30 and face plate 78 is longer than the minimum distance by a predetermined increment value.

By using inaccessible point detecting part 24 and accessible point setting part (or third setting part) 26 (or by steps S7 and S8), when the inaccessible point where robot 30 cannot reach exists, an optimum accessible point where robot 30 can reach can be automatically calculated and set. Therefore, a period of time required for setting the posture of tool 44 can be significantly reduced.

According to the robot teaching device of the present invention, the target, advance and rotation angles of the tool can be automatically set, and thus a period of time required for setting the posture of the tool can be significantly reduced. Further, by calculating and setting the rotation angle of the tool about the longitudinal axis thereof, so that the height of the face plate of the robot from the horizon plane is maximum at the rotation angle, the flat and stable posture of the tool can be obtained, and processing accuracy can be improved.

By using the detecting part and the third setting part, when the inaccessible point where the robot cannot reach exists, the accessible point where the robot can reach can be calculated and set, whereby a period of time required for setting the posture of the tool can be significantly reduced.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot teaching device for locating a workpiece and a robot having a tool in a virtual space, and for setting a target angle, an advance angle and a rotation angle about a longitudinal axis of the tool, the angles being used to determine a posture of the tool when the robot processes the workpiece, the robot teaching device comprising a robot controller, wherein the robot controller is configured to
locate three-dimensional models of the robot and the workpiece in the virtual space, designate a processing portion of the three-dimensional model of the workpiece, store a combination of shapes of a plurality of predetermined processing portions and the target angle and the advance angle of the tool associated with each of the processing portions, select the shape of the processing portion corresponding to the designated processing portion, among the plurality of shapes of the processing portions stored in the robot controller, set the target angle and the advance angle of the tool associated with the selected shape of the processing portion, as a target angle and an advance angle of the tool with respect to the designated processing portion, rotate the tool about the longitudinal axis of the tool while the target angle and the advance angle of the tool relative to the processing portion are maintained, and calculate and set the rotation angle of the tool about the longitudinal axis of the tool, wherein a height of a face plate of the robot from a horizon plane of the virtual space is maximum at the rotation angle.

2. The robot teaching device as set forth in claim 1, wherein the robot controller is further configured to detect an inaccessible point unreachable by the robot when the robot is moved while maintaining the target angle, the advance angle and the rotation angle of the tool which are set relative to the processing portion, rotate the tool about the longitudinal axis of the tool at the inaccessible point, while the target angle and the advance angle of the tool relative to the processing portion are maintained, and calculate and set an accessible point reachable by the robot, wherein a distance between an origin of the robot and the face plate of the robot is minimum at the accessible point.

3. A robot teaching device for locating a workpiece and a robot having a tool in a virtual space, and for setting a target angle, an advance angle and a rotation angle about a longitudinal axis of the tool, the angles being used to determine a posture of the tool when the robot processes the workpiece, the robot teaching device comprising a computer, wherein the computer is configured to locate three-dimensional models of the robot and the workpiece in the virtual space, designate a processing portion of the three-dimensional model of the workpiece, store a combination of shapes of a plurality of predetermined processing portions and the target angle and the advance angle of the tool associated with each of the processing portions, select the shape of the processing portion corresponding to the designated processing portion, among the plurality of shapes of the processing portions stored in the computer, set the target angle and the advance angle of the tool associated with the selected shape of the processing portion, as a target angle and an advance angle of the tool with respect to the designated processing portion, rotate the tool about the longitudinal axis of the tool while the target angle and the advance angle of the tool relative to the processing portion are maintained, and calculate and set the rotation angle of the tool about the longitudinal axis of the tool, wherein a height of a face plate of the robot from a horizon plane of the virtual space is maximum at the rotation angle.

4. The robot teaching device as set forth in claim 3, wherein the computer is further configured to detect an inaccessible point unreachable by the robot when the robot is moved while maintaining the target angle, the advance angle and the rotation angle of the tool which are set relative to the processing portion, rotate the tool about the longitudinal axis of the tool at the inaccessible point, while the target angle and the advance angle of the tool relative to the processing portion are maintained, and calculate and set an accessible point reachable by the robot, wherein a distance between an origin of the robot and the face plate of the robot is minimum at the accessible point.

* * * * *